US012791896B2

(12) United States Patent
Wang et al.

(10) Patent No.: US 12,791,896 B2

(45) Date of Patent: Nov. 10, 2026

(54) DISPLAY DEVICE AND METHOD OF FORMING THE SAME

(71) Applicant: AUO Corporation, Hsinchu City (TW)

(72) Inventors: Ho-Hsiang Wang, Hsinchu City (TW); Yen-Chang Chen, Hsinchu City (TW); Sheng-Yuan Chiu, Hsinchu City (TW); Guan-Di Chiou, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 19/389,256

(22) Filed: Nov. 14, 2025

(65) Prior Publication Data

US 2026/0299355 A1 Oct. 1, 2026

(30) Foreign Application Priority Data

Mar. 26, 2025 (TW) ................................ 114111610

(51) Int. Cl.
*G02F 1/13357* (2006.01)
*G02F 1/1335* (2006.01)

(52) U.S. Cl.
CPC .. *G02F 1/133608* (2013.01); *G02F 1/133607* (2021.01)

(58) Field of Classification Search
CPC .. G02B 6/0096; G02B 6/0095; G02B 6/0093; G02B 6/0091; G02B 6/009; G02B 6/0081; G02B 6/0088; G02F 1/133607; G02F 1/133608
See application file for complete search history.

(56) References Cited

FOREIGN PATENT DOCUMENTS

| | | | | |
|---|---|---|---|---|
| CN | 111462627 A | | 7/2020 | |
| CN | 114791643 A | * | 7/2022 | ........... G02B 5/3033 |
| EP | 2066162 A1 | * | 6/2009 | ........... H05K 5/0217 |
| KR | 20100038877 A | | 4/2010 | |
| TW | 201628846 A | * | 8/2016 | |

* cited by examiner

*Primary Examiner* — Anabel Ton
(74) *Attorney, Agent, or Firm* — WPAT, PC

(57) ABSTRACT

A display device and a method of forming the same are provided. The display device includes a frame, a primer layer, an adhesive layer and a cover lens. The frame includes plural corner portions and plural connecting portions, and the connecting portions are connected by the corner portions. The primer layer is disposed on the frame, in which the primer layer is not disposed on the corner portions. The adhesive layer is disposed on the frame and the primer layer. The cover lens is disposed on the frame and is bonded with the frame by the adhesive layer. Therefore, stress concentration can be reduced, and the reliability of the display device can be increased.

20 Claims, 4 Drawing Sheets

100

DISPLAY DEVICE AND METHOD OF FORMING THE SAME

CROSS-REFERENCE TO RELATED APPLICATION

This application claims priority to Taiwan Application Serial Number 114111610, filed Mar. 26, 2025, which is herein incorporated by reference.

BACKGROUND

Field of Invention

The present invention relates to a display device and a method of forming the same. More particularly, the present invention relates to the display device including a primer layer and the method of forming the same.

Description of Related Art

Conventional display device, especially the display device applied in automobile products, has increasing demand for narrow border. However, there's limitation in cutting process for the conventionally used foam tape; thus, it cannot be used to manufacture the display device having narrow border such that liquid structural adhesive is used instead. Compared to the foam tape, the liquid structural adhesive has greater elastic modulus, so peeling often occurs at the corners of the frame when performing a low temperature reliability test on the product formed with the liquid structural adhesive.

Therefore, it is needed to provide the display device and the method of forming the same to improve peeling-off problem of an adhesive layer at the corners of the frame.

SUMMARY

An aspect of the present invention provides a display device, which excludes a primer layer from being disposed on corner portions of a frame, thereby decreasing stress and improving the peeling-off problem of the primer layer and an adhesive layer at corners of the frame.

Another aspect of the present invention provides a method of forming the display device, which includes coating the primer layer on the frame without coating the primer layer on the corner portions, thereby decreasing stress and improving the peeling-off problem of the primer layer and an adhesive layer at corners of the frame.

According to the aspect of the present invention, the display device is provided. The display device includes a frame, a primer layer, an adhesive layer and a cover lens. The frame includes plural corner portions and plural connecting portions, and the connecting portions are connected by the corner portions. The primer layer is disposed on the frame, in which the primer layer is excluded from being disposed on the corner portions of the frame. The adhesive layer is disposed on the frame and the primer layer. The cover lens is disposed on the frame, in which the cover lens is bonded with the frame by the adhesive layer.

According to an embodiment of the present invention, the primer layer is disposed on the connecting portions of the frame, and the primer layer is disposed non-continuously.

According to an embodiment of the present invention, the adhesive layer is continuously mounted on the frame in a surrounding pattern.

According to an embodiment of the present invention, the frame further includes a base plate, and the cover lens is disposed on the base plate.

According to an embodiment of the present invention, the display device further includes a backlight module disposed within the frame; and a panel, in which the panel is bonded on the cover lens by an optical glue layer, and the panel is located between the backlight module and the cover lens.

According to an embodiment of the present invention, the display device further includes a cover primer layer disposed around the cover lens, in which the adhesive layer is located between the primer layer and the cover primer layer.

According to another aspect of the present invention, the method of forming a display device is provided. The method includes providing a frame, in which the frame includes plural corner portions and plural connecting portions, and the connecting portions are connected by the corner portions; coating a primer layer on the frame, in which the primer layer is not coated on the corner portions; coating an adhesive layer on the frame and the primer layer; covering a cover lens on the frame; and curing the adhesive layer so as to bond the cover lens to the frame.

According to an embodiment of the present invention, the step of coating the primer layer includes coating the primer layer on the connecting portions non-continuously.

According to an embodiment of the present invention, the method further includes disposing a panel into the frame before covering the cover lens; disposing an optical glue layer on the panel; and covering the cover lens on the optical glue layer.

According to an embodiment of the present invention, the step of coating the adhesive layer includes coating the adhesive layer around continuously so as to dispose the adhesive layer on the frame.

According to an embodiment of the present invention, the step of coating the adhesive layer includes coating the adhesive layer on the corner portions and the connecting portions of the frame.

According to an embodiment of the present invention, the method further includes disposing a backlight module within the frame before covering the cover lens.

According to an embodiment of the present invention, the adhesive layer includes optical glue, and the step of curing the adhesive layer includes exposing the adhesive layer to UV, thereby curing the adhesive layer.

According to the aspect of the present invention, the display device is provided. The display device includes a frame, a primer layer, an adhesive layer and a cover lens. The frame includes plural corner portions and plural connecting portions, and the connecting portions are connected by the corner portions. The primer layer is disposed on the connecting portions of the frame. The adhesive layer is disposed on the frame and the primer layer, in which the adhesive layer directly contacts the corner portions of the frame. The cover lens is disposed on the frame.

According to an embodiment of the present invention, the primer layer is excluded from being disposed on the corner portions of the frame.

According to an embodiment of the present invention, the adhesive layer is continuously mounted on the frame in a surrounding pattern.

According to an embodiment of the present invention, the primer layer includes plural primer segments, and the primer segments are disposed non-continuously on each of the connecting portions of the frame.

According to an embodiment of the present invention, the primer layer and the adhesive layer are disposed between the cover lens and the frame.

According to an embodiment of the present invention, the display device further includes a backlight module disposed within the frame; and a panel, in which the panel is bonded on the cover lens by an optical glue layer, and the panel is located between the backlight module and the cover lens.

According to an embodiment of the present invention, the display device further includes a cover primer layer disposed around the cover lens, in which the adhesive layer is located between the primer layer and the cover primer layer.

The display device and the method of forming the same of the present invention is applied to dispose the primer layer for increasing adhesive force, and the primer layer is excluded from being disposed on the corner portions of the frame, thereby reducing stress concentration and increasing reliability of the display device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
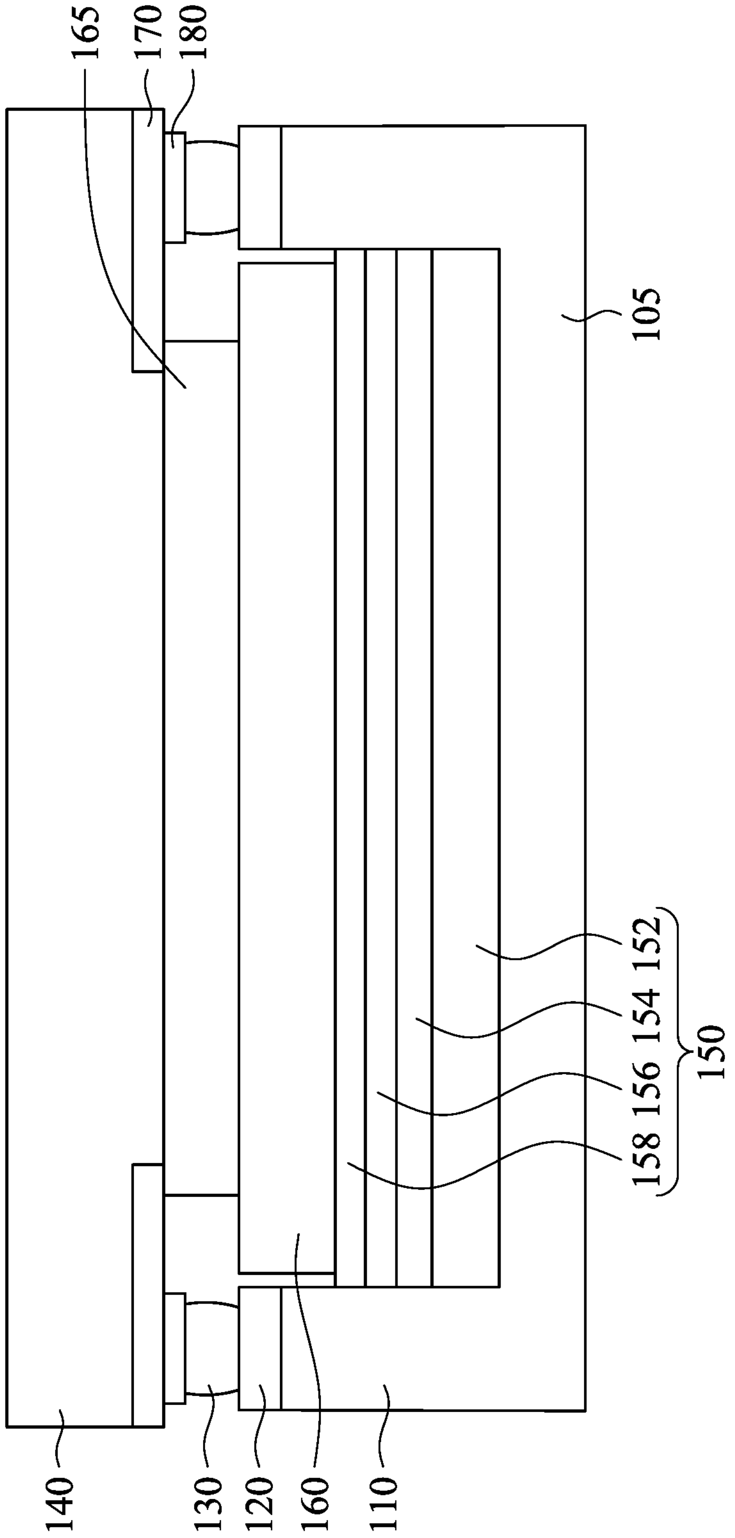
FIG. 1A illustrates a cross section view of a display device according to some embodiments of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Fabrication and application of embodiments of the present invention are discussed in detail below. However, it is understood that the embodiments provide many applicable invention concepts, which can be implemented in a variety of specific contents. The discussed specific embodiments are only provided for illustrative purpose only and are not intended to limit the scope of the present invention.

As used herein, “around,” “about,” “approximately,” or “substantially” shall generally mean within 20 percent, or within 10 percent, or within 5 percent of a given value or range.

According to above, the display device and the method of forming the same are provided in the present invention. The primer layer is disposed to increase adhesive force, and the primer layer is excluded from being disposed on the corner portions of the frame, thereby reducing stress concentration. Therefore, problem of the adhesive layer peeling off at the corners can be improved.

Referring to FIG. 1A, FIG. 1A illustrates a cross section view of a display device 100 according to some embodiments of the present invention. As shown in FIG. 1A, the display device includes a frame 110, a primer layer 120, an adhesive layer 130 and a cover lens 140. In some embodiments, the primer layer 120 and the adhesive layer 130 are disposed on the frame, and the adhesive layer 130 is disposed on the primer layer 120. In some embodiments, the cover lens 140 is bonded on the frame 110 through the primer layer 120 and the adhesive layer 130. The primer layer 120 and the adhesive layer 130 used in the present invention are not specially limited, only if the primer and the adhesive are suitable for use in conjunction with each other.

In some embodiments, the display device 100 can selectively include a backlight module 150 disposed within the frame 110 and a panel 160 disposed between the backlight module 150 and the cover lens 140. In such embodiment, the panel 160 is bonded on the cover lens 140 by an optical glue layer 165. Disposition of the backlight module 150 is the same as the disposition of the conventional backlight module. For example, the backlight module 150 includes a light guide plate 152, an optical film 154, an optical film 156, an optical film 158, a reflective sheet (not labeled in figure), a light emitting element (not labeled in figure), and etc. Numbers and types of the optical film can be adjusted according to application requirement. It is not further discussed herein, and it is not limited in the present invention.

In some embodiments, the display device 100 can selectively include an ink layer 170 for light shielding, in which the ink layer 170 is disposed between the cover lens 140 and the adhesive layer 130. In some embodiments, the display device 100 can selectively include a cover primer layer 180 disposed around the cover lens 140, and the adhesive layer 130 is disposed between the primer layer 120 and the cover primer layer 180, thereby enhancing adhesion of the cover lens 140 and the frame 110.

Figure 1B:
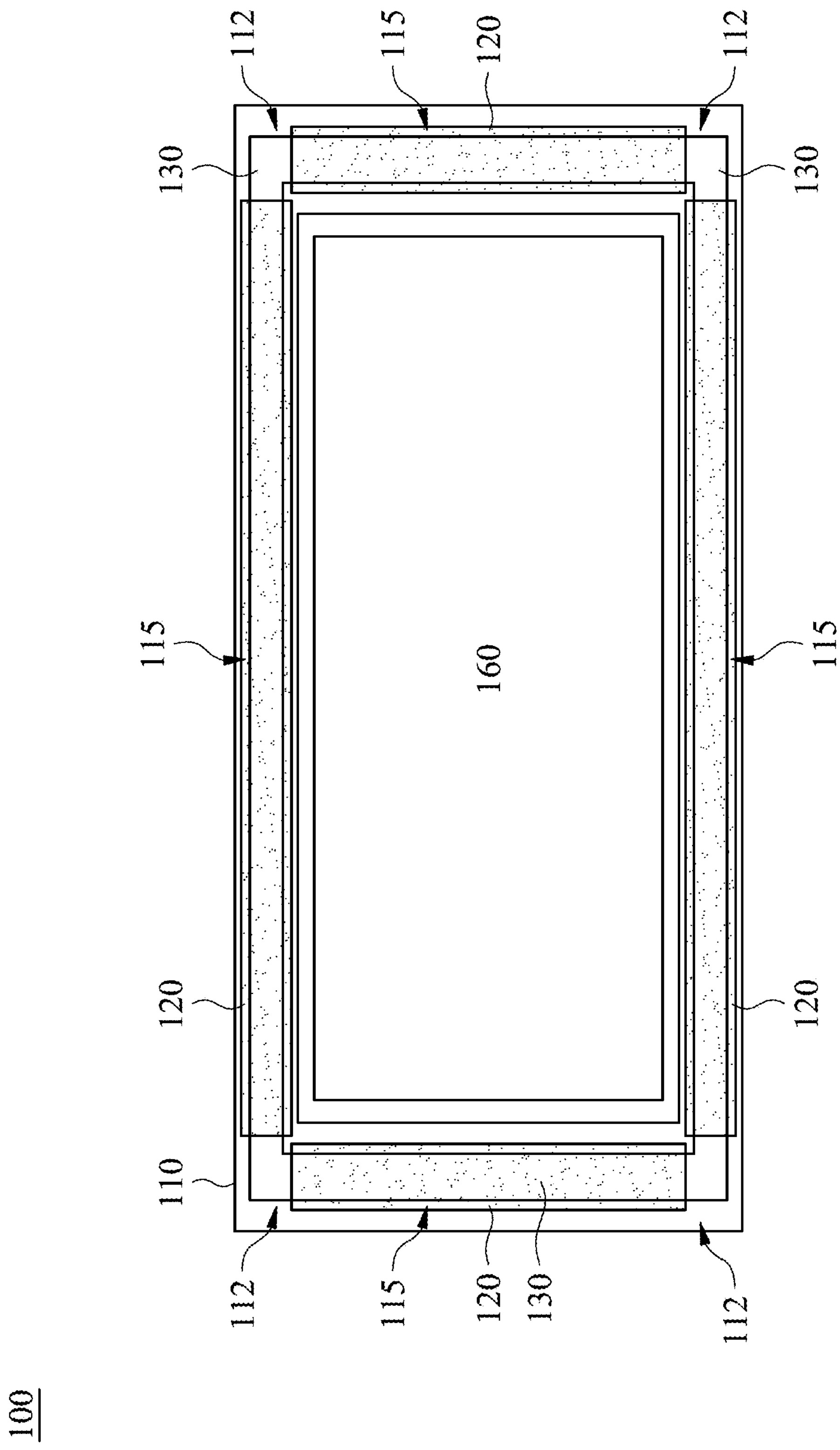
FIG. 1B illustrates a top view of a display device according to some embodiments of the present invention.

Referring to FIG. 1B, FIG. 1B illustrates a top view of the display device 100 according to some embodiments of the present invention. In order to show configuration of the primer layer 120 and the adhesive layer 130, the elements above which such as the cover lens 140, the ink layer 170 and the cover primer layer 180 are omitted in FIG. 1B. The frame 110 includes four corner portions 112 and four connecting portions 115, in which each of the connecting portions 115 is connected to another one of the connecting portions 115 by one of the corner portions 112. The frame 110 in FIG. 1B is illustrated in rectangular shape, but it is not limited in the present invention. That is, the frame can be arbitrary polygon, so numbers of the corner portions and the connecting portions of the frame are not limited to four, but they can vary according to shape of the frame. In some embodiments, the frame 110 is a framework only including the corner portions 112 and the connecting portions 115. In other embodiments, the frame 110 further includes a base plate 105 surrounded by the corner portions 112 and the connecting portions 115 so as to dispose the cover lens 140 (and the backlight module 150, if any) on the base plate 105.

As shown in FIG. 1B, the primer layer 120 is not disposed on the corner portions 112 of the frame, but only disposed on the connecting portions 115. Since the corner portions 112 of the frame is the location with maximum stress, the primer layer 120 is excluded from being disposed on the corner portions 112, thereby decreasing stress and avoiding the adhesive layer 130 and the primer layer 120 of the display device 100 from peeling off at the corner portions 112. In some embodiments, the adhesive layer 130 is disposed on the primer layer 120 on the connecting portions 115 and disposed on the corner portions 112. In other words, the adhesive layer 130 is continuously mounted on the frame 110 in a surrounding pattern. Thus, the adhesive layer 130 directly contacts the corner portions 112 of the frame 110.

Figure 1C:
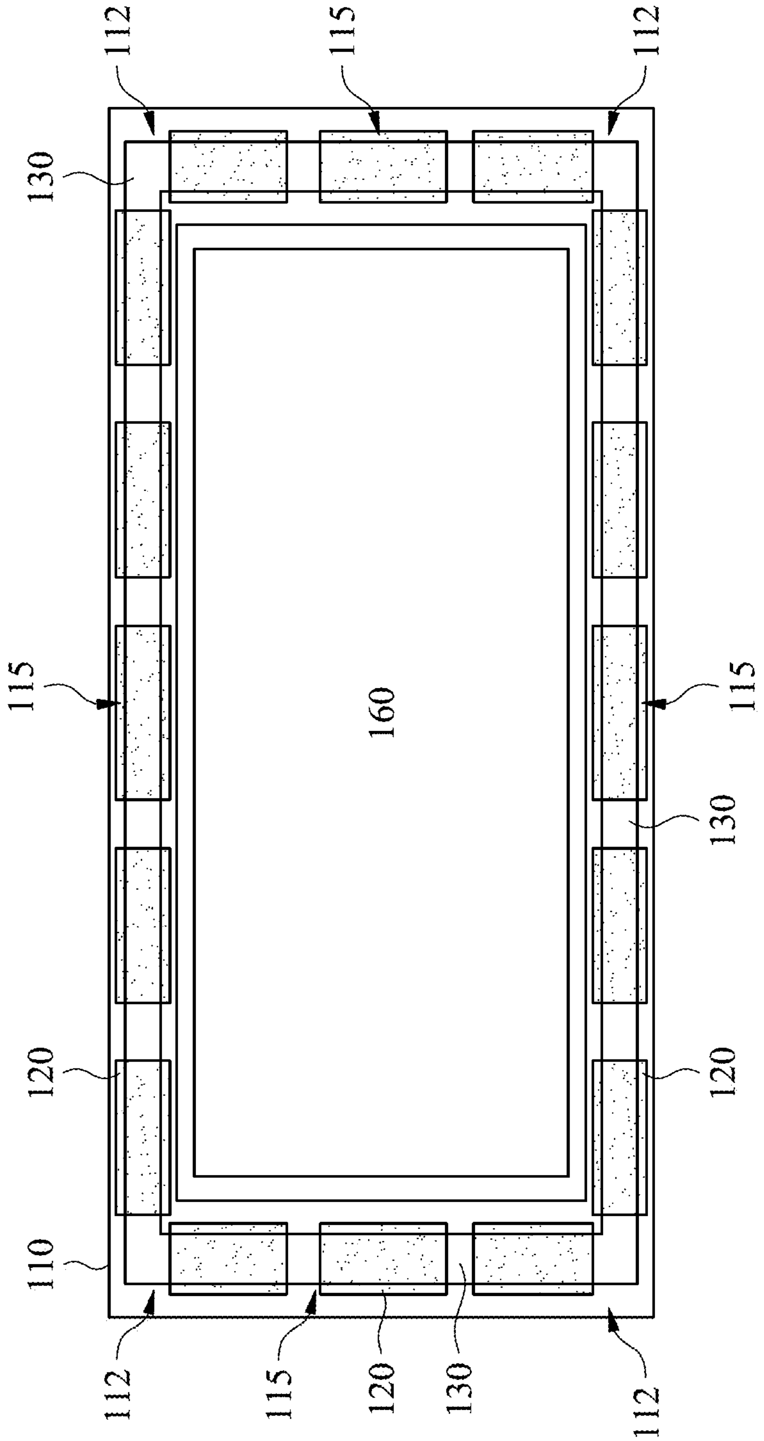
FIG. 1C illustrates a top view of a display device according to other embodiments of the present invention.

Referring to FIG. 1C, FIG. 1C illustrates a top view of the display device 100' according to other embodiments of the present invention. The display device 100' of FIG. 1C is almost the same as the display device 100 of FIG. 1B, and the cross sectional view of the display device 100' is also shown as FIG. 1A. The only difference is that in the display device 100', the primer layer 120 on the connecting portions 115 is non-continuously disposed, namely, disposed in segments. In other words, in addition to directly disposing on the corner portions 112, portions of the adhesive layer 130 further directly contact the connecting portions 115. Thus, it can further reduce stress and increase shear force.

Figure 2:
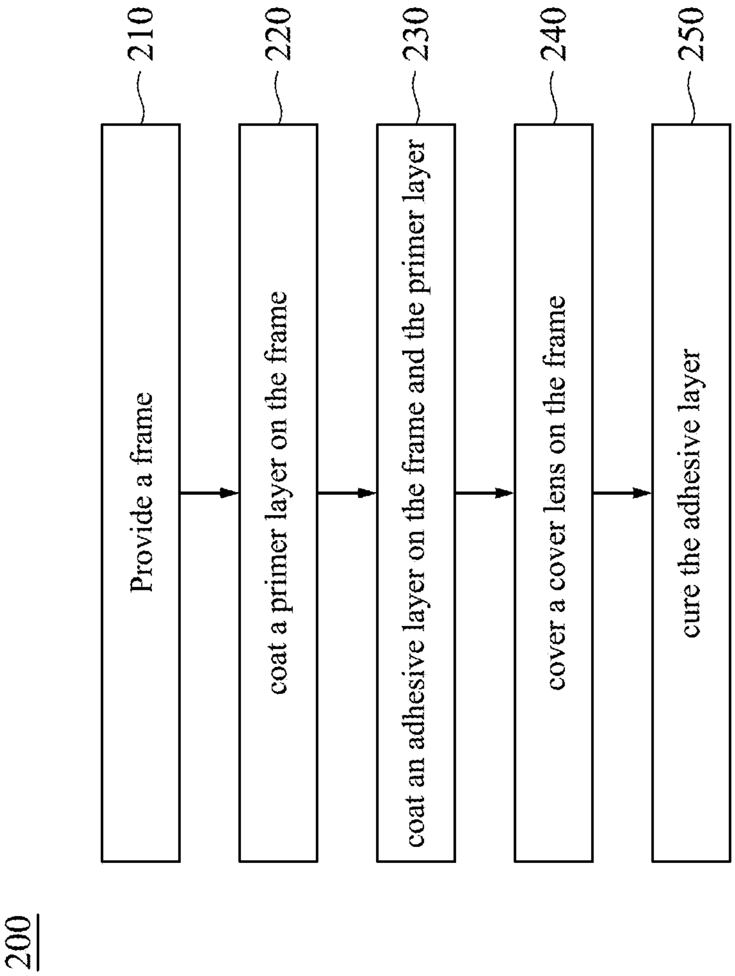
FIG. 2 illustrates a flow chart of a method of forming the display device according to some embodiments of the present invention.

Referring to FIG. 2, FIG. 2 illustrates a flow chart of a method 200 of forming the display device according to some embodiments of the present invention. The following discuss the method 200 by combining FIGS. 1A-1C and FIG. 2. First, operation 210 is performed to provide the frame 110. In some embodiments, the frame 110 includes the plural corner portions 112 and the plural connecting portions 115, in which the connecting portions 115 are connected with each other by the corner portions 112.

Subsequently, operation 220 is performed to coat the primer layer 120 on the frame 110, in which the primer layer 120 is not coated on the corner portions 112 of the frame 110. In other words, the primer layer 120 is only coated on the connecting portions 115 of the frame 110. In some embodiments, as shown in FIG. 1C, the operation 220 includes non-continuously coating the primer layer 120 on the connecting portions 115.

Then, operation 230 is performed to coat the adhesive layer 130 on the frame 110 and the primer layer 120. In some embodiments, the operation 230 includes continuously coating the adhesive layer around so as to dispose the adhesive layer on the frame 110. Thus, the adhesive layer 130 is coated on the corner portions 112 and the connecting portions 115 of the frame 110.

Subsequently, operation 240 is performed to cover the cover lens 140 on the frame 110. In some embodiments, before the operation 240, the panel can be selectively disposed into the frame 110, and the optical glue layer 165 is disposed on the panel 160. In such embodiment, the cover lens 140 is covered on the optical glue layer 165. In some embodiments, the backlight module 150 is selectively disposed within the frame 110.

After coating the adhesive layer 130, operation 250 is performed to cure the adhesive layer 130. In some embodiments that the adhesive layer 130 includes optical glue, the operation 250 includes letting the adhesive layer 130 stand for about 30 minutes after exposing to UV light, thereby curing the adhesive layer 130. Thus, the cover lens 140 can be bonded to the frame 110, thereby obtaining the display device 100.

Application of the method 200 of forming the display device of the present invention to form the display device 100 can decrease stress at the corner portions 112 by excluding from coating the primer layer 120 on the corner portions 112 of the frame 110, thereby avoiding peeling of the adhesive layer 130 and the primer layer of the display device 100 occurs at the corner portions 112 of the frame 110, and further increasing reliability of the product.

The following Embodiments are provided to better elucidate the practice of the present invention and should not be interpreted in anyway as to limit the scope of same. Those skilled in the art will recognize that various modifications may be made while not departing from the spirit and scope of the invention. All publication and patent applications mentioned in the specification are indicative of the level of those skilled in the art to which this invention pertains.

Embodiments 1-2 and Comparative Example

Embodiments 1-2 and comparative example all used the same primer and adhesive to manufacture the display device, in which the primer included isopropanol in 97% to 99.5% and 3-Glycidoxypropyltrimethoxysilane in 0.5% to 3.0%. The differences are that embodiment 1 only coated the primer on the connecting portions of the frame but not coated on the corner portions; embodiment 2 also not coated the primer on the corner portions of the frame and non-continuously coated the primer on the connecting portions; and comparative example coated the primer completely around the frame, namely, coated the primer on the connecting portions and the corner portions.

Embodiments 1-2 and comparative example form three display devices, respectively, and all of the display devices complied with standard at the initial condition. Subsequently, the display devices of embodiments 1-2 and comparative example are performed multi-cycle reliability test, respectively. Each reliability test includes raising the display device from room temperature to 85° C., then lower the temperature to −40° C., and then back to room temperature. Test results are shown in following table 1.

TABLE 1

| | 100 cycles | 200 cycles | 300 cycles | 400 cycles | 500 cycles | 1000 cycles | Result |
|---|---|---|---|---|---|---|---|
| Embodiment 1 | ○ | ○ | ○ | ○ | ○ | ○ | Pass |
| Embodiment 2 | ○ | ○ | ○ | ○ | ○ | ○ | Pass |
| Comparative example | X | — | — | — | — | — | Peeling-off |

According to results of table 1, comparative example failed to pass reliability test for 100 cycles, namely, peeling-off occurred. Comparatively, embodiments 1 and 2 both passed reliability test for 1000 cycles and no peeling-off occurred. Therefore, embodiments 1 and 2 excluded from disposing the primer layer on the corner portions of the frame did effectively avoid peeling-off and increase reliability of the display device.

According to above embodiments, the present invention provides the display device and the method of forming the same, which increase adhesion by disposing the primer layer and reduce stress concentration and increase reliability of the display device by excluding from disposing the primer layer on the corner portions of the frame.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:

a frame, wherein the frame comprises a plurality of corner portions and a plurality of connecting portions, and the connecting portions are connected by the corner portions;

a primer layer, disposed on the frame, wherein the primer layer is excluded from being disposed on the corner portions of the frame, and the primer layer is disposed on the connecting portions of the frame;

an adhesive layer, disposed on the frame and the primer layer; and a cover lens, disposed on the frame, wherein the cover lens is bonded with the frame by the adhesive layer.

2. The display device of claim 1, wherein the primer layer is disposed non-continuously.

3. The display device of claim 1, wherein the adhesive layer is continuously mounted on the frame in a surrounding pattern.

4. The display device of claim 1, wherein the frame further comprises a base plate, and the cover lens is disposed on the base plate.

5. The display device of claim 1, further comprising:

a backlight module, disposed within the frame; and a panel, wherein the panel is bonded on the cover lens by an optical glue layer, and the panel is located between the backlight module and the cover lens.

6. The display device of claim 1, further comprising:

a cover primer layer, disposed around the cover lens, wherein the adhesive layer is located between the primer layer and the cover primer layer.

7. A method of forming a display device, comprising:

providing a frame, wherein the frame comprises a plurality of corner portions and a plurality of connecting portions, and the connecting portions are connected by the corner portions;

coating a primer layer on the frame, wherein the primer layer is not coated on the corner portions;

coating an adhesive layer on the frame and the primer layer;

covering a cover lens on the frame; and curing the adhesive layer so as to bond the cover lens to the frame.

8. The method of claim 7, wherein coating the primer layer comprises:

coating the primer layer on the connecting portions non-continuously.

9. The method of claim 7, further comprising:

disposing a panel into the frame before covering the cover lens;

disposing an optical glue layer on the panel; and covering the cover lens on the optical glue layer.

10. The method of claim 7, wherein coating the adhesive layer comprises:

coating the adhesive layer around continuously so as to dispose the adhesive layer on the frame.

11. The method of claim 7, wherein coating the adhesive layer comprises:

coating the adhesive layer on the corner portions and the connecting portions of the frame.

12. The method of claim 7, further comprising:

disposing a backlight module within the frame before covering the cover lens.

13. The method of claim 7, wherein the adhesive layer comprises optical glue, and curing the adhesive layer comprises:

exposing the adhesive layer to UV, thereby curing the adhesive layer.

14. A display device, comprising:

a frame, wherein the frame comprises a plurality of corner portions and a plurality of connecting portions, and the connecting portions are connected by the corner portions;

a primer layer, disposed on the connecting portions of the frame;

an adhesive layer, disposed on the frame and the primer layer, wherein the adhesive layer directly contacts the corner portions of the frame; and a cover lens, disposed on the frame.

15. The display device of claim 14, wherein the primer layer is excluded from being disposed on the corner portions of the frame.

16. The display device of claim 14, wherein the adhesive layer is continuously mounted on the frame in a surrounding pattern.

17. The display device of claim 14, wherein the primer layer comprises a plurality of primer segments, and the primer segments are disposed non-continuously on each of the connecting portions of the frame.

18. The display device of claim 14, wherein the primer layer and the adhesive layer are disposed between the cover lens and the frame.

19. The display device of claim 14, further comprising:

a backlight module, disposed within the frame; and a panel, wherein the panel is bonded on the cover lens by an optical glue layer, and the panel is located between the backlight module and the cover lens.

20. The display device of claim 14, further comprising:

a cover primer layer, disposed around the cover lens, wherein the adhesive layer is located between the primer layer and the cover primer layer.

* * * * *